United States Patent
Chang et al.

(10) Patent No.: US 11,745,266 B2
(45) Date of Patent: Sep. 5, 2023

(54) ADDITIVE MANUFACTURING OF METALS

(71) Applicant: HEWLETT-PACKARD DEVELOPMENT COMPANY, L.P., Spring, TX (US)

(72) Inventors: Seongsik Chang, Palo Alto, CA (US); Krzysztof Nauka, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,898

(22) PCT Filed: Apr. 30, 2018

(86) PCT No.: PCT/US2018/030175
§ 371 (c)(1),
(2) Date: Oct. 21, 2019

(87) PCT Pub. No.: WO2019/212481
PCT Pub. Date: Nov. 7, 2019

(65) Prior Publication Data
US 2021/0362237 A1    Nov. 25, 2021

(51) Int. Cl.
*B22F 10/28*    (2021.01)
*B33Y 10/00*    (2015.01)
*B33Y 70/00*    (2020.01)
*B33Y 80/00*    (2015.01)
*B22F 12/41*    (2021.01)
(Continued)

(52) U.S. Cl.
CPC ............. *B22F 10/28* (2021.01); *B22F 10/36* (2021.01); *B22F 12/41* (2021.01); *B33Y 10/00* (2014.12); *B33Y 70/00* (2014.12); *B33Y 80/00* (2014.12); *B22F 12/45* (2021.01); *B22F 2301/052* (2013.01)

(58) Field of Classification Search
CPC ..................................................... B22F 10/28
See application file for complete search history.

(56) References Cited

U.S. PATENT DOCUMENTS 5,155,324 A *  10/1992  Deckard ................. C23C 26/02
                                                          264/497
7,820,097 B2   10/2010  Schroder et al.
9,050,775 B2    6/2015  Fu et al.
(Continued)

FOREIGN PATENT DOCUMENTS

RU         2550669 C1    5/2015
WO    WO1992008567 A1    5/1992

*Primary Examiner* — Jophy S. Koshy
*Assistant Examiner* — Joshua S Carpenter
(74) *Attorney, Agent, or Firm* — SHOOK, HARDY & BACON L.L.P.

(57) ABSTRACT

An example method for additive manufacturing of metals includes spreading a build material including a metal in a sequence of layers. Each layer has a respective thickness, a respective sequence position, and a respective exposed surface to receive energy from a flood energy source prior to spreading of a subsequent layer. Each respective exposed surface has a surface area of at least 5 square centimeters ($cm^2$). Layer-by-layer, the exposed surface of each layer is exposed to the radiated energy from the flood energy source. The energy is radiated at an intensity profile and a fluence sufficient to cause a consolidating transformation of the build material in the exposed layer.

12 Claims, 5 Drawing Sheets

(51) Int. Cl.
*B22F 10/36* (2021.01)
*B22F 12/45* (2021.01)

(56) References Cited

U.S. PATENT DOCUMENTS

| | | |
|---|---|---|
| 9,598,776 B2 | 3/2017 | Abed et al. |
| 2014/0314966 A1* | 10/2014 | Fink ................. H01B 1/026 427/559 |
| 2015/0181714 A1 | 6/2015 | Ahmed et al. |
| 2016/0011543 A1 | 1/2016 | Qi et al. |
| 2017/0165792 A1* | 6/2017 | Buller ................. B23K 26/702 |
| 2017/0178946 A1 | 6/2017 | Zenou et al. |
| 2017/0232515 A1 | 8/2017 | Demuth et al. |
| 2017/0250298 A1 | 8/2017 | Korgel et al. |
| 2017/0341145 A1* | 11/2017 | Foster ................. B22F 10/20 |

* cited by examiner

ADDITIVE MANUFACTURING OF METALS

BACKGROUND

Additive manufacturing may involve the application of successive layers of material to make solid parts. This is unlike traditional machining processes, which often rely upon the removal of material to create the final part. One example of an additive manufacturing process is three-dimensional (3D) printing. 3D printing may be used to make three-dimensional solid parts from a digital model, and is often used in rapid product prototyping, mold generation, mold master generation, and short run manufacturing. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultraviolet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

In examples of the methods for additive manufacturing of metals disclosed herein, photonic fusion is used. Photonic fusion may be faster, more efficient, and less expensive than other additive manufacturing processes (e.g., selective laser sintering (SLS), selective laser melting (SLM), scanning electron beam melting, etc.). In examples of photonic fusion as disclosed herein, a build material layer is exposed to radiated energy from a flood energy source. The flood energy source exposes the entire build material layer to the radiated energy without scanning the layer. The radiated energy causes a consolidating transformation of the build material in the exposed layer.

Build Materials

The build material includes a metal. The metal may be in powder form, i.e., particles. In the present disclosure, the term "particles" means discrete solid pieces of components of the build material. As used herein, the term "particles" does not convey a limitation on the shape of the particles. As examples, the metal particles may be non-spherical, spherical, random shapes, or combinations thereof.

The metal particles may also be similarly sized particles or differently sized particles. The individual particle size of each of the metal particles is up to 100 micrometers (μm). In an example, the metal particles may have a particle size ranging from about 1 μm to about 100 μm. In another example, the individual particle size of the metal particles ranges from about 1 μm to about 30 μm. In still another example, the individual particle size of the metal particles ranges from about 2 μm to about 50 μm. In yet another example, the individual particle size of the metal particles ranges from about 5 μm to about 15 μm. As used herein, the term "individual particle size" refers to the particle size of each individual build material particle. As such, when the metal particles have an individual particle size ranging from about 1 μm to about 100 μm, the particle size of each individual metal particle is within the disclosed range, although individual metal particles may have particle sizes that are different than the particle size of other individual metal particles. In other words, the particle size distribution may be within the given range. The particle size of the metal particles refers to the diameter or volume weighted mean/average diameter of the metal particle, which may vary, depending upon the morphology of the particle.

In an example, the metal may be a single phase metallic material composed of one element. In this example, the sintering temperature of the build material may be below the melting point of the single element. In another example, the metal may be composed of two or more elements, which may be in the form of a single phase metallic alloy or a multiple phase metallic alloy. In these other examples, sintering may occur over a range of temperatures.

In some examples the metal is aluminum (Al) or an alloy thereof. In one of these examples, the metal is AlSi10Mg. AlSi10Mg is an aluminum alloy including: from 9 weight percent (wt %) to 11 wt % of Si; from 0.2 wt % to 0.45 wt % of Mg; 0.55 wt % or less of Fe; 0.05 wt % or less of Cu; 0.45 wt % or less of Mn; 0.05 wt % or less of Ni; 0.1 wt % or less of Zn; 0.05 wt % or less of Pb; 0.05 wt % or less of Sn; 0.15 wt % or less of Ti; and a balance of Al. When the metal is AlSi10Mg, the metal may be suited for thermal and/or low weight applications. In other examples, the metal may be 2xxx series aluminum or 4xxx series aluminum.

Methods for Additive Manufacturing of Metals

Figure 1:
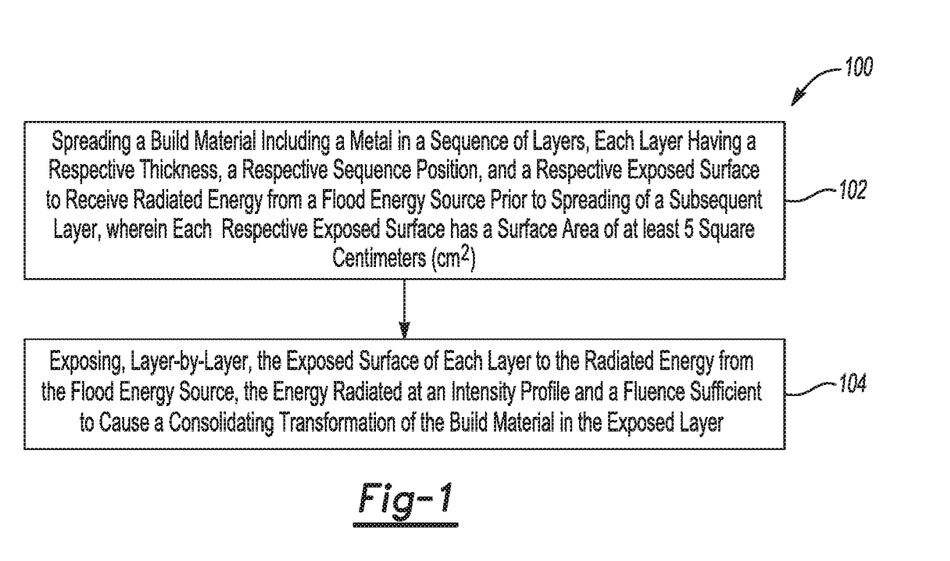
FIG. 1 is a flow diagram illustrating an example of a method for additive manufacturing of metals disclosed herein.
Figure 2:
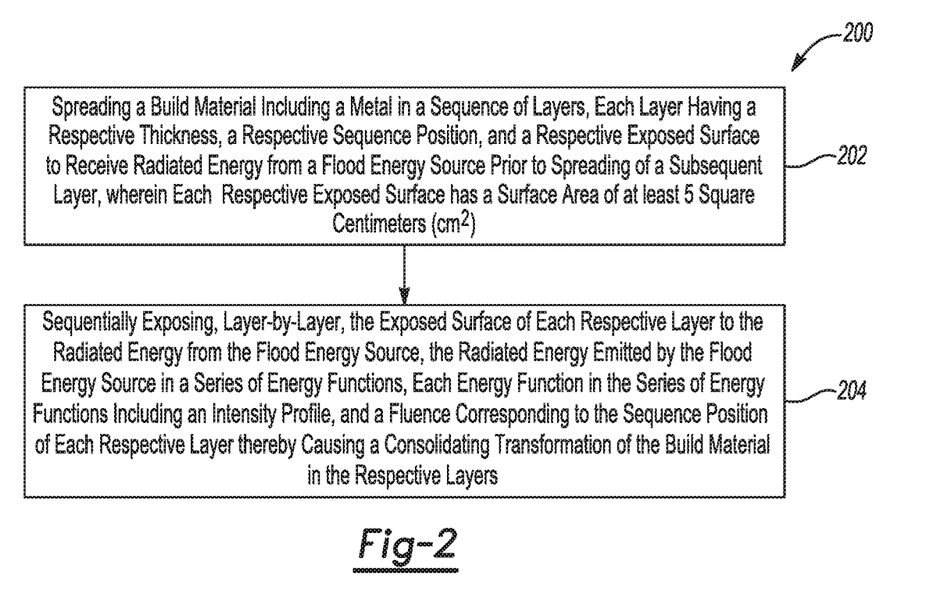
FIG. 2 is a flow diagram illustrating an example of another method for additive manufacturing of metals disclosed herein.

Referring now to FIG. 1 and FIG. 2, examples of methods 100, 200 for additive manufacturing of metals are depicted. Prior to execution of the methods 100, 200 or as part of the methods 100, 200, a controller 28 (see, e.g., FIG. 4) may access data stored in a data store 30 (see, e.g., FIG. 4) pertaining to a 3D part that is to be manufactured.

Figure 3A:
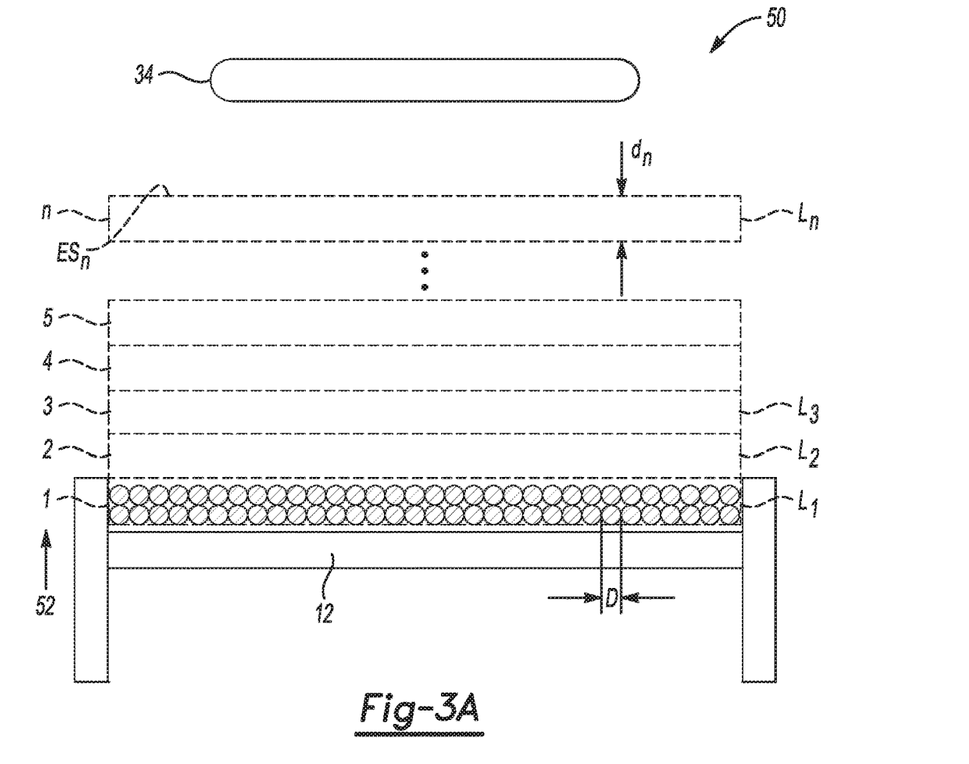
FIG. 3A is a schematic, side cross-sectional view of an example of a sequence of layers according to the present disclosure.
Figure 3B:
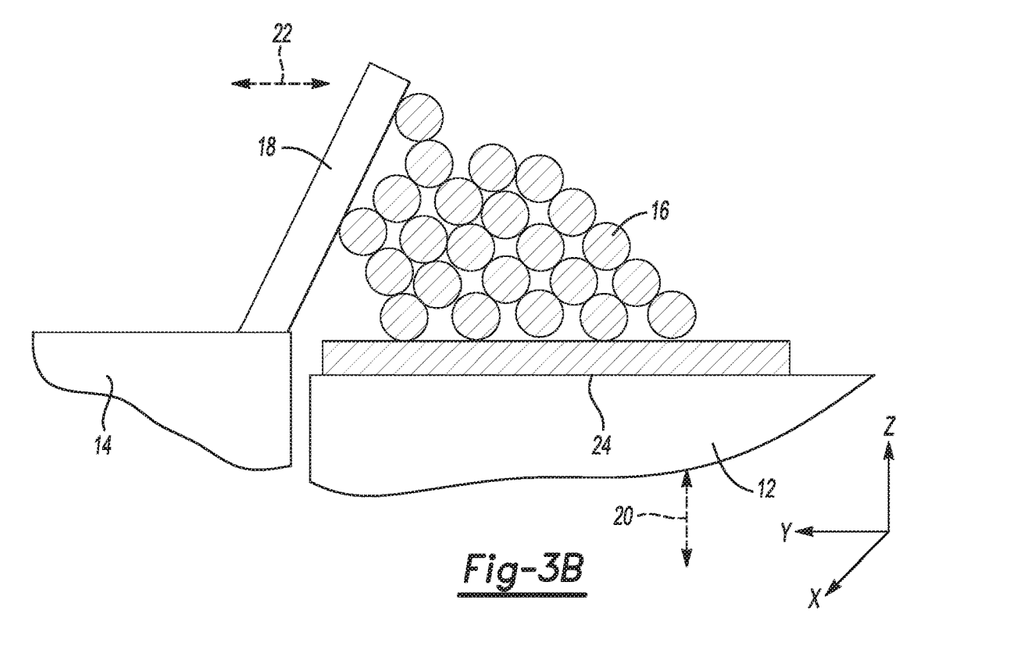
FIGS. 3B and 3C are schematic and partially cross-sectional views depicting the formation of an intermediate part using an example of a method disclosed herein.
Figure 3C:
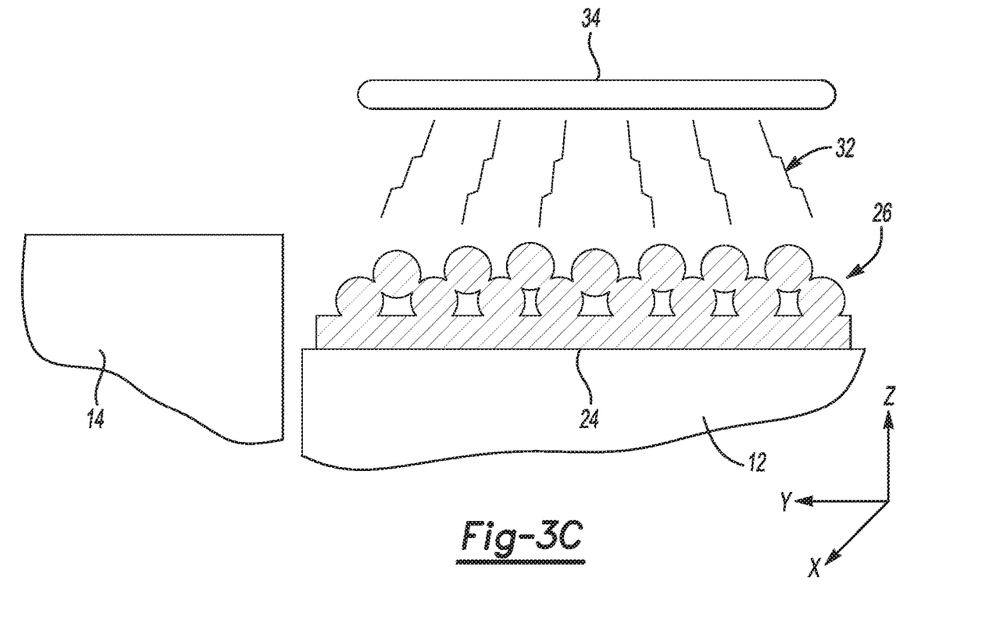

As shown in FIG. 1, an example of the method 100 for additive manufacturing of metals comprises: spreading a build material 16 including a metal in a sequence of layers, each layer having a respective thickness, a respective sequence position, and a respective exposed surface to receive radiated energy 32 from a flood energy source 34 prior to spreading of a subsequent layer, wherein each respective exposed surface has a surface area of at least 5 square centimeters (cm²) (as shown at reference numeral 102 and in FIG. 3B); and exposing, layer-by-layer, the exposed surface of each layer to the radiated energy 32 from the flood energy source 34, the energy 32 radiated at an intensity profile 40 (see, e.g., FIG. 5) and a fluence sufficient to cause a consolidating transformation of the build material 16 in the exposed layer (as shown at reference numeral 104 and in FIG. 3C).

As shown in FIG. 2, an example of the method 200 for additive manufacturing of metals comprises: spreading a build material 16 including a metal in a sequence of layers, each layer having a respective thickness, a respective sequence position, and a respective exposed surface to receive radiated energy 32 from a flood energy source 34 prior to spreading of a subsequent layer, wherein each respective exposed surface has a surface area of at least 5 square centimeters (cm²) (as shown at reference numeral 202 and in FIG. 3B); and sequentially exposing, layer-by-layer, the exposed surface of each respective layer to the radiated energy 32 from the flood energy source 34, the radiated energy emitted by the flood energy source 34 in a series of energy functions, each energy function in the series of energy functions including an intensity profile 40 and a fluence corresponding to the sequence position of each respective layer thereby causing a consolidating transformation of the build material 16 in the respective layers (as shown at reference numeral 204 and in FIG. 3C).

Referring briefly to FIG. 3A, a schematic side cross-sectional view of an example of a sequence 50 of layers according to the present disclosure is shown. The sequence position k of each layer $L_k$ in the sequence 50 is shown in the column of numbers indicated by reference numeral 52. The sequence position k is indicated by natural numbers beginning with 1, incremented by 1, and ending with n. Although the example of the sequence 50 of layers shown in FIG. 3A has 5 expressly numbered layers, it is to be understood that the quantity of layers in the sequence 50 of layers may be any natural number greater than 1 in examples of the present disclosure. Each layer $L_k$ in the sequence 50 of layers may be uniquely identified herein by the letter "L" with the corresponding sequence position k written as a subscript k. For example, each layer $L_k$ may be an element of a sequence $\{L_1, L_2, L_3, \ldots L_n\}$. Similarly, the thickness $d_k$ corresponding to the layer $L_k$ may be an element of a sequence $\{d_1, d_2, d_3, \ldots, d_n\}$. The exposed surface $ES_k$ corresponding to the layer $L_k$ may be an element of a sequence $\{ES_1, ES_2, ES_3, \ldots, ES_n\}$.

It may be convenient to use the following notation:

$$E = \{[I(t)_1, f_1], [I(t)_2, f_2], [I(t)_3, f_3], \ldots, [I(t)_n, f_n]\} \quad \text{(Eq. 1)}$$

In Eq. 1, E is a series of energy functions $[I(t)_k, f_k]$; each Intensity profile $I(t)_k$ corresponds to sequence position k, each Intensity profile is a function of time (t); each fluence $f_k$ corresponds to sequence position k; and the sequence positions k uniquely correspond to a layer $L_k$. The Intensity profiles may be collectively represented as $I = \{[I(t)_1], [I(t)_2], [I(t)_3] \ldots [I(t)_n]\}$; and the fluences may be collectively represented as $f = \{f_1, f_2, f_3, \ldots, f_n\}$.

As shown at reference numeral 102 in FIG. 1 and at reference numeral 202 in FIG. 2, the methods 100, 200 include spreading a build material 16 in a sequence 50 of layers. As mentioned above, the build material 16 includes the metal. Build material 16 used in the methods 100, 200 may be any of the examples described above.

An enlarged (as compared to FIG. 3A), schematic, and partially cross-sectional cutaway view of the build material 16 being spread in one layer of the sequence 50 of layers is shown in FIG. 3B. In the example shown in FIG. 3B, a 3D printer (e.g., 3D printer 10 shown in FIG. 4) may be used to apply the build material 16. The 3D printer 10 may include a build area platform 12, a build material supply 14 containing the build material 16, and a build material distributor 18.

The build area platform 12 receives the build material 16 from the build material supply 14. The build area platform 12 may be moved in the directions as denoted by the opposed arrows 20, e.g., along the z-axis, so that the build material 16 may be delivered to the build area platform 12 or to a previously formed layer (e.g., layer 24). In an example, when the build material 16 is to be delivered, the build area platform 12 may be programmed to advance (e.g., downward) enough so that the build material distributor 18 can push the build material 16 onto the build area platform 12 to form a substantially uniform layer of the build material 16 thereon. The build area platform 12 may also be returned to its original position, for example, when a new part is to be built.

The build material supply 14 may be a container, bed, or other surface that is to position the build material 16 between the build material distributor 18 and the build area platform 12.

The build material distributor 18 may be moved in the directions as denoted by the two-headed arrow 22, e.g., along the y-axis, over the build material supply 14 and across the build area platform 12 to spread the layer $L_k$ of the build material 16 over the build area platform 12 or a previously formed layer. The build material distributor 18 may also be returned to a position adjacent to the build material supply 14 following the spreading of the build material 16. The build material distributor 18 may be a blade (e.g., a doctor blade), a roller, a combination of a roller and a blade, and/or any other device capable of spreading the build material 16 over the build area platform 12. For instance, the build material distributor 18 may be a counter-rotating roller. In some examples, the build material supply 14 or a portion of the build material supply 14 may translate along with the build material distributor 18 such that build material 16 is delivered continuously to the build material distributor 18 rather than being supplied from a single location at the side of the 3D printer 10 as depicted in FIG. 3B.

As shown in FIG. 3B, the build material supply 14 may supply the build material 16 in a position so that the build material 16 is ready to be spread onto the build area platform 12 or a previously formed layer. The build material distributor 18 may spread the supplied build material 16 onto the build area platform 12 or a previously formed layer. The controller 28 may process "control build material supply" data, and in response control the build material supply 14 to appropriately position the particles of the build material 16, and may process "control spreader" data, and in response, control the build material distributor 18 to spread the supplied build material 16 over the build area platform 12 to form the sequence of layers thereon.

It is to be understood that the number of layers in the sequence 50 may depend, in part, on the 3D part to be manufactured, and/or the thickness $d_k$ of each layer $L_k$. Further, each layer $L_k$ has a respective thickness $d_k$, a respective sequence position k, and a respective exposed surface $ES_k$ to receive radiated energy 32 from a flood energy source 34 prior to spreading of a subsequent layer $L_{k+1}$.

The thickness $d_k$ of each layer $L_k$ may be substantially the same as the thickness $d_{(notk)}$ of each other layer $L_{(notk)}$ in the sequence 50 of layers or the thickness $d_k$ of one or more of the layers $L_k$ may be different than the thickness $d_{(notk)}$ of other layers $L_{(notk)}$ in the sequence 50 of layers. In an example, the respective thickness $d_k$ of each layer $L_k$ is substantially the same as the thickness $d_{(notk)}$ of each other layer $L_{(notk)}$ in the sequence 50 of layers.

Each layer $L_k$ may have a substantially uniform thickness $d_k$ across the build area platform 12. In an example, each layer $L_k$ has a thickness $d_k$ ranging from about 90 µm to about 110 µm, although thinner or thicker layers may be used. For example, each layer $L_k$ may have a thickness $d_k$ ranging from about 50 µm to about 200 µm. In another example, each layer $L_k$ has a thickness $d_k$ ranging from about 30 µm to about 300 µm. In still another example, each layer $L_k$ has a thickness $d_k$ ranging from about 20 µm to about 500 µm. In an example, the respective thickness $d_k$ of each layer $L_k$ may be about 2× (i.e., 2 times) the diameter D (see FIG. 3A) of a particle of the build material 16 at a minimum for finer part definition. In some examples, the layer thickness may be about 1.2× the diameter D of a particle of the build material 16.

In one specific example, the build material 16 is an AlSi10Mg powder and the thickness $d_k$ of each layer $L_k$ is from about 40 micrometers (µm) to about 100 µm.

The respective sequence position k of each layer $L_k$ corresponds to the order in which the sequence 50 of layers is applied. As such, the layer $L_1$ applied directly on the build area platform 12 has a sequence position of 1; the layer $L_2$ having a sequence position of 2, is applied directly on the layer $L_1$, which has the sequence position of 1 has a sequence position of 2; and so on. In other words, each layer $L_k$ applied after the first layer $L_1$ (i.e., the layer with the sequence position of 1) has a sequence position equal to k, where k minus 1 is equal to the sequence position of the immediately preceding layer. The term "preceding" refers to layers formed (spread and exposed to the radiated energy 32) before the current layer $L_k$. As such, preceding layers are below/underneath the current layer $L_k$. The term "subsequent" refers to layers formed after the current layer $L_k$. As such, subsequent layers are to be applied above/on top of the current layer $L_k$.

As mentioned above, each layer $L_k$ has an exposed surface $ES_k$ to receive radiated energy 32 from a flood energy source 34 prior to spreading of a subsequent layer $L_{k+1}$. As also mentioned above, the exposed surface $ES_k$ of each layer $L_k$ has a surface area of at least 5 cm$^2$. The exposed surface $ES_k$ of each layer $L_k$ is the surface that is opposed to the surface that is in contact with build area platform 12 or immediately preceding layer $L_{k-1}$, and is parallel to the surface of the build area platform 12. Prior to the spreading of the subsequent layer $L_{k+1}$, the exposed surface $ES_k$ of each layer $L_k$ can be exposed to radiated energy 32 from the flood energy source 34. After the spreading of the subsequent layer $L_{k+1}$, the surface of each layer that was exposed is covered with the subsequent layer $L_{k+1}$.

As shown at reference numeral 104 and at reference numeral 204 in FIG. 2, the methods 100, 200 include exposing (or sequentially exposing), layer-by-layer, the exposed surface $ES_k$ of each layer $L_k$ (or respective layer $L_k$) to the radiated energy 32 from the flood energy source 34. In the method 100, the energy 32 is radiated at an intensity profile 40 and a fluence sufficient to cause a consolidating transformation of the build material 16 in the exposed layer $L_k$. In the method 200, the radiated energy 32 is emitted by the flood energy source 34 in a series E of energy functions.

Each energy function in the series E of energy functions includes an intensity profile $I(t)_k$, 40 and a fluence $f_k$ corresponding to the sequence position k of each respective layer $L_k$ thereby causing a consolidating transformation of the build material 16 in the respective layers.

As used herein, a "consolidating transformation" refers to the at least partial melting or sintering of the build material 16. In some examples (such as, when the exposed/respective layer $L_k$ has a sequence position greater than 1), the consolidating transformation includes the neck-to-neck sintering of at least 50 percent of particles in the build material 16 of the exposed/respective layer $L_k$. In another example (such as when the exposed/respective layer $L_1$ has a sequence position of 1), the consolidating transformation is the melting of at least 70 percent of the particles in the build material 16 of the exposed/respective layer $L_k$. In still another example, the consolidating transformation includes the fusion between layers (e.g., between an exposed/respective layer $L_k$ having a sequence position k greater than 1 and the layer $L_{k-1}$ having a sequence position k-1 one less than the sequence position k of the exposed/respective layer $L_k$).

As used herein, the term "intensity" refers to the power per area (e.g., kilowatts per square centimeter (kW/cm$^2$)) of the radiated energy 32. The term "fluence," as used herein, refers to the total energy per area (e.g., Joules per square centimeter (J/cm$^2$)) of the radiated energy 32. The area referred to in the intensity and the fluence is the area of exposed surface $ES_k$ that receives the radiated energy 32.

As used herein, an "intensity profile" 40 refers to the intensity of the radiated energy 32 over a set duration 44. As such, fluctuations in the intensity of the radiated energy 32 that may occur throughout the emission of the radiated energy 32 are conveyed by the intensity profile 40. In one example of the intensity profile 40, the intensity may undergo exponential decay as the radiated energy 32 is emitted. In another example of the intensity profile 40, the intensity may oscillate in a wave as the radiated energy 32 is emitted. In yet another example of the intensity profile (not shown), the intensity may remain constant for the duration of the intensity profile.

Figure 5:
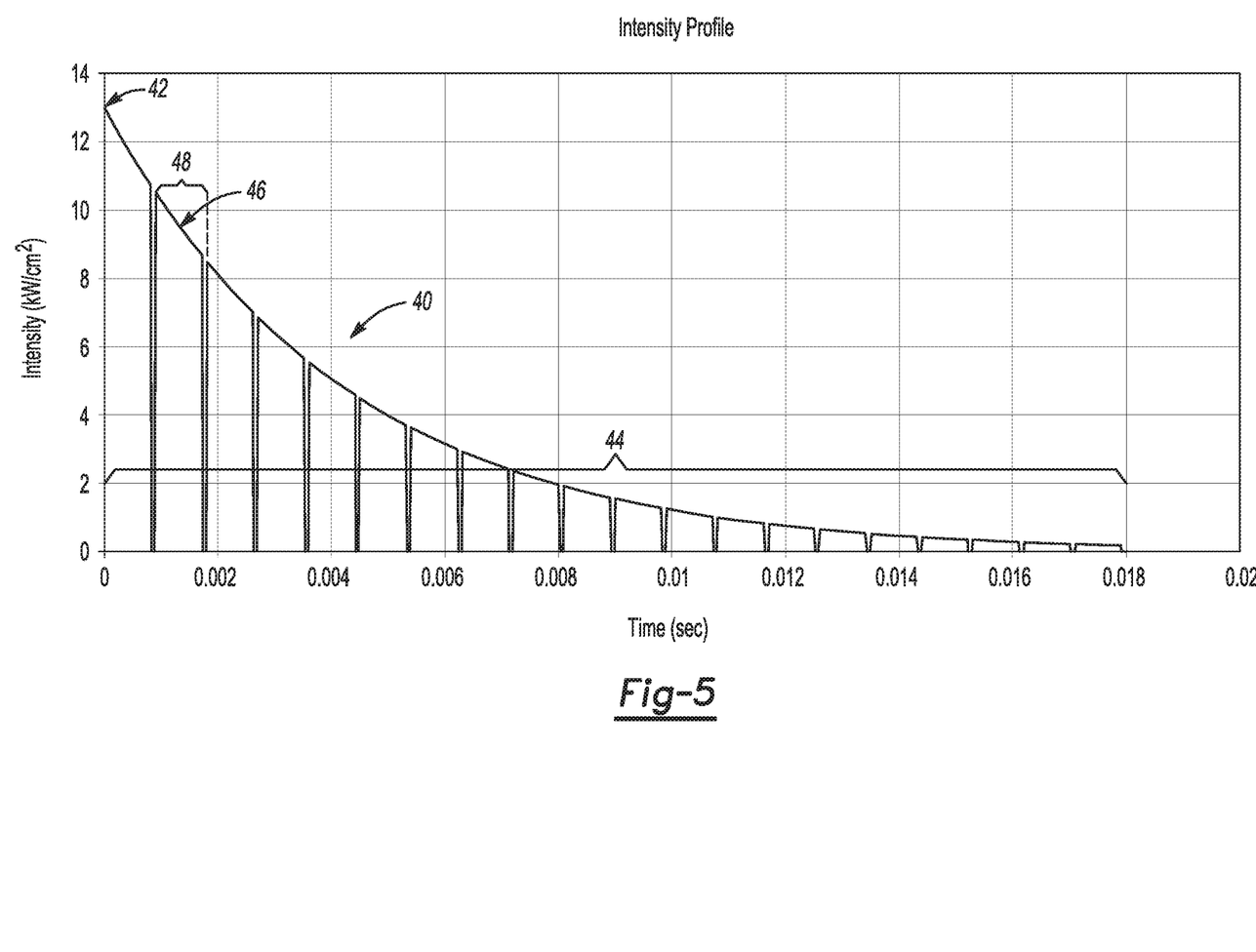
FIG. 5 is a graph depicting an example of an intensity profile, with intensity (in kW/cm$^2$) shown on the vertical axis and time (in sec.) shown on the horizontal axis.

In some examples, the intensity profile 40 includes an intensity, a profile duration 44, and a number of profile slices 46. One example of an intensity profile 40 is shown in FIG. 5. In an example, the intensity profile 40 shown in FIG. 5 may be used to cause the consolidating transformation of build material 16 including AlSi10Mg powder. In another example, the intensity profile 40 shown in FIG. 5 may be produced using a xenon pulse lamp as the flood energy source 34 at a voltage of 700 V. In FIG. 5, intensity, in kW/cm$^2$, is shown on the vertical axis, and time, in seconds (sec.), is shown on the horizontal axis.

The intensity of the intensity profile 40 may be the peak intensity 42. In an example, the flood energy source 34 is a source (e.g., xenon pulse lamp) that creates an exponentially decaying intensity (see, e.g., FIG. 5), and the intensity of the intensity profile 40 is the peak intensity 42. In the example shown in FIG. 5, the intensity of the intensity profile 40 is the peak intensity 42, and the peak intensity 42 is about 13 kW/cm$^2$. While the peak intensity 42 depicted in FIG. 5 is shown to be about 13 kW/cm$^2$, it is to be understood that other peak intensities (e.g., 8 kW/cm$^2$, 10 kW/cm$^2$, 15 kW/cm$^2$, 17 kW/cm$^2$, etc.) may be used. In an example, the peak intensity 42 of the intensity profile 40 ranges from about 5 kW/cm$^2$ to about 100 kW/cm$^2$.

The profile duration 44 is the amount of time for which a set emission of the radiated energy 32 lasts. It is to be understood that the intensity profile 40 may include periods of time where zero energy is emitted, for example, in an intensity profile 40 that is divided into profile slices 46, the profile slices 46 having a duty cycle less than 100 percent. In some examples, the profile duration 44 may correspond to the emission capacity of the flood energy source 34. In the example shown in FIG. 5, the profile duration 44 is about 0.018 seconds. While the profile duration 44 depicted in FIG. 5 is shown to be about 0.018 seconds, it is to be understood that other profile durations (e.g., 0.013 seconds, 0.015 seconds, 0.02 seconds, 0.022 seconds, etc.) may be used. In an example, the intensity profile 40 has a profile duration 44 ranging from about 100 microseconds (μsec) to about 30 milliseconds (msec).

The intensity profile 40 may be divided into profile slices 46. For example, dividing an intensity profile 40 into profile slices 46 may allow cooling and reduce the temperature of the flood energy source 34 and/or the exposed/respective layer $L_k$. As shown in FIG. 5, the intensity profile 40 may be divided into the profile slices 46 by very briefly pausing (e.g., for 0.08 milliseconds) the emission of energy 32 from the flood energy source 34. Each profile slice 46 includes an emission and a pause. The amount of time for which each profile slice 46 lasts (including both the emission and the pause) is the slice width 48. The pauses may occur at set intervals, and each pause may be for the same amount of time. As such, the slice width 48 may be the same for each profile slice 46. In the example shown in FIG. 5, each profile slice 46 has a slice width 48 of about 0.9 milliseconds. While the slice width 48 depicted in FIG. 5 is shown to be about 0.9 milliseconds, it is to be understood that other slice widths (e.g., 0.6 milliseconds, 0.8 milliseconds, 1.2 milliseconds, 1.5 milliseconds, etc.) may be used. In an example, the slice width 48, ranges from about 0.2 milliseconds to about 20 milliseconds.

When the intensity profile 40 is divided into profile slices 46, the duty cycle of the intensity profile 40 indicates the percentage of each profile slice 46 during which energy is emitted. In the example shown in FIG. 5, the duty cycle of the intensity profile 40 is about 91%. As such, during each profile slice 46, energy 32 is emitted for about 0.82 milliseconds (91% of a 0.9 millisecond slice width 48) and the pause lasts for about 0.08 milliseconds (0.9 milliseconds minus 0.82 milliseconds). While the duty cycle of the intensity profile 40 depicted in FIG. 5 is shown to be about 91%, it is to be understood that other duty cycles (e.g., 65%, 75%, 80%, 95%, etc.) may be used. In an example, the duty cycle of the intensity profile 40 ranges from about 5% to 100%. When the duty cycle is 100%, there are no pauses and the intensity profile 40 is not divided into profile slices 46.

The number of profile slices 46 in the intensity profile 40 is equal to the number of pauses. It is to be understood that while the last pause comes at the end of the intensity profile 40, and may be indistinguishable from the end of the set emission, it is part of the intensity profile 40 (as shown in FIG. 5). As such, the length of the last pause is included in the profile duration 44 and the slice width 48 of the last profile slice 46. In the example shown in FIG. 5, the intensity profile 40 includes 20 profile slices 46. While the number of profile slices 46 depicted in FIG. 5 is shown to be 20, it is to be understood that other numbers of profile slices 46 (e.g., 2, 15, 18, 22, 25, etc.) may be used. In an example, the number of profile slices 46 ranges from 1 to 100. When the number of profile slices 46 is 1, there are no pauses, the duty cycle is 100%, and the intensity profile 40 is not divided into profile slices 46.

The fluence of the intensity profile 40 is equal to the area under the intensity profile in the time domain. In other words, the fluence is equal to the total amount of energy applied per area when the radiated energy 32 is emitted from the flood energy source 34 according to the intensity profile 40. In the example shown in FIG. 5, the fluence is about 50 J/cm². While the fluence depicted in FIG. 5 is about 50 J/cm², it is to be understood that other fluences (e.g., 40 J/cm², 45 J/cm², 55 J/cm², 60 J/cm², etc.) may be achieved with other intensity profiles 40. As an example, a larger peak intensity 42, a longer profile duration 44, and/or a higher duty cycle may be used to achieve a larger fluence.

In an example, the fluence of the radiated energy 32 from the flood energy source 34 ranges from about 10 J/cm² to about 70 J/cm². In another example, the fluence of the radiated energy 32 from the flood energy source 34 ranges from about 10 J/cm² to about 100 J/cm². In another example (e.g., when the exposed/respective layer $L_1$ has a sequence position of 1), the fluence ranges from about 17 J/cm² to about 40 J/cm². In still another example (e.g., when the exposed/respective layer $L_k$ has a sequence position of greater than 1), the fluence ranges from about 10 J/cm² to about 40 J/cm². In yet another example, the build material 16 is a build material powder having an average particle size of about 40 μm, and the fluence is a product of 17 J/cm² and the ratio of the respective thickness of the layer to the average particle size of the build material powder.

In some examples, the flood energy source 34 repeatedly emits the radiated energy 32 defined by the intensity profile 40 in a predetermined number of stages at a repetition rate. In these examples, the repeated emission of the radiated energy 32 defined by the intensity profile 40 may make up the energy function for an exposed/respective layer. In an example, the predetermined number of stages ranges from 1 to 100. In another example, the repetition rate has a period of about 0.1 second to about 10 seconds.

In other examples, the energy function for an exposed/respective layer $L_k$ consists of a single intensity profile 40.

One energy function corresponds to each layer $L_k$ in the sequence 50 of layers. The intensity profile(s) $I(t)_k$, 40 and fluence $f_k$ of each energy function $[I(t)_k, f_k]$ is such that the radiated energy 32 defined by the energy function $[I(t)_k, f_k]$ is sufficient to cause the consolidating transformation of the build material 16.

It is to be understood that the energy function and/or intensity profile(s) 40 for one or more of the layers $L_k$ may be different from the energy function and/or intensity profile(s) 40 for other layers $L_{notk}$ in the sequence 50 of layers. For example, the energy function $[I(t)_1, f_1]$ and/or intensity profile(s) $I(t)_1$, 40 for the first layer $L_1$ (i.e., the layer having the sequence position of 1) may be different than the energy function $[I(t)_{>1}, f_{>1}]$ and/or intensity profile(s) $I(t)_{>1}$, 40 for each subsequent layer $L_{>1}$ (i.e., each layer having a sequence position greater than 1). The energy function $[I(t)_k, f_k]$ and/or intensity profile(s) $I(t)_k$, 40 for each layer $L_k$ may depend, in part, on the metal of the build material 16, the thickness $d_k$ of the layer $L_k$, and/or the sequence position k of the layer $L_k$.

In some examples, the amount of energy propagated to other layers from or through the exposed/respective layer $L_k$ may be compensated for in the intensity profile 40. For example, the fluence may be made larger by increasing the slice width 48 and/or the duty cycle. Another way to increase the fluence is to increase the peak intensity 42 of the intensity profile 40 with or without adjusting the slice width 48 or duty cycle.

In an example, the amount of energy propagated to other layers from or through the exposed/respective layer $L_k$ may be determined from a thermal conductivity of the build material 16. For example, a build material 16 having a higher thermal conductivity (e.g., the thermal conductivity of AlSi10Mg, about 170 W/m/K) may propagate more of the energy received over a short time. If more of the energy 32 is propagated to a lower layer, the temperature of the lower layer may be higher, and the temperature of the upper layer may be lower. In other words, the lower layers of high conductivity materials may act as heat sinks, such that the intensity or fluence in a particular time period that is sufficient to sinter the exposed/respective layer $L_k$ is increased.

In one specific example, the build material 16 has a thermal conductivity greater than or equal to 150 Watts per meter per Kelvin (W/m/K); and the fluence of the radiated energy 32 from the flood energy source 34 is from about 10 Joules per square centimeter ($J/cm^2$) to about 70 $J/cm^2$ at the exposed surface $ES_k$ of each layer $L_k$ and a peak intensity 42 of the intensity profile 40 is from about 5 kilowatts per square centimeter ($kW/cm^2$) to about 40 $kW/cm^2$ at the exposed surface $ES_k$ of each layer $L_k$.

In another specific example, the build material 16 has a thermal conductivity greater than or equal to 150 Watts per meter per Kelvin (W/m/K); and the fluence corresponding to the sequence position k of each respective layer $L_k$ is from about 10 Joules per square centimeter ($J/cm^2$) to about 70 $J/cm^2$ at the exposed surface $ES_k$ of the respective layer $L_k$; and a peak intensity 42 of the intensity profile 40 corresponding to the sequence position k of each respective layer $L_k$ is from about 5 kilowatts per square centimeter ($kW/cm^2$) to about 40 $kW/cm^2$ at the exposed surface $ES_k$ of the respective layer $L_k$.

In some examples, the Marangoni effect may be compensated for in the intensity profile 40. The Marangoni effect is a convection process of material migration due to area variation of surface tension. The local mass density of an exposed/respective layer $L_k$ may vary throughout the layer $L_k$ due, in part, to variations in particle size, packing density, etc. When the exposed/respective layer $L_k$ is exposed to radiated energy 32, variation in the local mass density may cause variation in temperature within the layer $L_k$, which in turn, may cause variation in the surface tension of melted metal within the layer $L_k$. Due to the Marangoni effect, melted metal with a lower surface tension may migrate towards melted metal with a higher surface tension. This migration may result in the formation of Marangoni effect cracks, which may be undesirable.

Without being held bound to any theory, it is believed that samples with higher surface temperatures during melting may have a greater tendency to incur Marangoni effect cracks. A rate of temperature rise of the exposed surface $ES_k$ depends on the difference between the rate of energy going into the exposed surface and a rate of energy going out of the exposed surface $ES_k$ as stated in the following equation:

$$\rho c d \frac{dT}{dt} = A(T) * I(T) - Q(T) \quad \text{(Eq. 2)}$$

In Eq. 2, ρ is density, c is specific heat, d is thickness of powder, T is temperature of powder, A(T) is absorptivity, I(T) is intensity of light, Q(T) is thermal loss. The thermal loss, also called the cooling, is relatively constant in the temperature range. Therefore, as intensity I(T) is higher, the heat input is higher, and therefore, temperature will increase at a faster rate (dT/dt) because cooling rate Q(T) is relatively insensitive to temperature in this range. Absorptivity A(T) will also change with temperature because a degree of sintering or melting will change a behavior of multiple scattering of light, therefore absorptivity. As the surface melts and becomes smoother, more light is reflected away from the surface, and less light is trapped between the particles. After melting occurs at the surface, the absorptivity A(T) may drop, making subsequent repeated stages of the intensity profile 40 less effective for adding energy and increasing temperature.

In some examples, the peak intensity 42 of the intensity profile 40 may be made smaller to compensate for the Marangoni effect. In one of these examples, a peak intensity 42 of the intensity profile 40 is less than a predetermined maximum intensity to limit Marangoni effect cracks in the exposed layer.

In some examples (e.g., when the layer $L_1$ has a sequence position of 1), a fluence that is sufficient to melt an entire layer $L_k$ may be achieved with the intensity profile 40. The fluence that is sufficient to melt the entire layer $L_k$ may be determined, in part, by using specific heat and heat of fusion relationships for the build material. It is to be understood that the following equations may be used to calculate an approximation or boundary for the fluence that may be made more accurate by, for example, considering other factors (such as rate of heat transfer, time for consolidation, absorptivity changes, spectral sensitivity, losses and/or any additional factors that contribute to the accuracy of calculations):

$$q = H_f m + cm\Delta T = m(H_f + c\Delta T) \quad \text{(Eq. 3)}$$

q=Energy per unit area
$H_f$=heat of fusion (J/g)
m=mass (g) per unit area
c=specific heat (J/g/K)

$$\Delta T = T_m - T_{room} \quad \text{(Eq. 4)}$$

$T_m$=Melting Point
$T_{room}$=Room Temperature=25° C.

$$m = \rho_b v \quad \text{(Eq. 5)}$$

$\rho_b$=bulk density of powder $$\rho_b = \rho \eta \quad \text{(Eq. 6)}$$

ρ=particle density of metal ($g/cm^3$)
η=packing density (packing fraction) (dimensionless)
v=volume $$v = D * A \quad \text{(Eq. 7)}$$

D=diameter of spherical particle (thickness of a single layer) (cm)
A=unit area ($cm^2$)
Substituting Eq. 6 and Eq. 7 into Eq. 5:

$$m = \rho \eta D A \quad \text{(Eq. 8)}$$

Assuming a single layer of spherical particles, packed in cubic lattice:

η=π/6=0.5236

Let D=40 μm=0.004 cm; let A=1 $cm^2$.

In one example, the build material 16 is an AlSi10Mg powder. For AlSi10Mg: $H_f$=321 (J/g); c=0.897 (J/g/K); $T_m$=660° C.; and ρ=2.68 $g/cm^3$.

Applying Eq. 8:

$$m = 2.68 \ (g/cm^3) * 0.5236 * 0.004 \ (cm) * 1 \ (cm^2)$$

$$m = 0.0056 \ (g)$$

Applying Eq. 4:

$$\Delta T = 660°\ C. - 25°\ C. = 635°\ C.$$

Applying Eq. 3:

$$q = 0.0056\ (g) * [321\ (J/g) + 0.897\ (J/g/K) * 635°\ C.]$$

$$q = 0.0056\ (g) * [321\ (J/g) + 570\ (J/g)]$$

$$q = 0.0056\ (g) * 891\ (J/g)$$

q=4.99 J per unit area for a layer that is 40 μm thick.

A portion of the fluence is actually input as energy into the build material 16 because the absorptivity of the build material 16 is less than 1. Absorptivity (A) of AlSi10Mg powder is about 0.3.

$$\text{fluence} * A = q \qquad (\text{Eq. 9})$$

$$\text{fluence} = q/A \qquad (\text{Eq. 10})$$

Applying Eq. 10: a fluence of 4.99 J/cm²/0.3=16.6 J/cm² should melt a layer of uniform spherical powder, 40 μm thick, when the powder is AlSi10Mg. For a layer of AlSi10Mg powder that is 70 μm thick, the minimum fluence expected to melt is about 16.6 J/cm²*70 μm/40 μm=29.1 J/cm².

As mentioned above, in some examples, the build material 16 is an AlSi10Mg powder and the thickness $d_k$ of each layer $L_k$ is from about 40 micrometers (μm) to about 100 μm.

In one of these examples, when the exposed layer $L_k$ is the first layer $L_1$ spread directly on a thermally insulating substrate (e.g., the build area platform 12): the fluence is from about 17 J/cm² to about 40 J/cm² at the exposed surface $ES_1$ of the first layer $L_1$; the peak intensity 42 of the intensity profile 40 is from about 5 kW/cm² to about 20 kW/cm² at the exposed surface $ES_1$ of the first layer $L_1$; and the consolidating transformation is a melting of at least 70 percent of particles in the build material 16 of the first layer $L_1$.

In another one of these examples, when the exposed layer $L_k$ has a sequence position greater than 1: the fluence is from about 10 J/cm² to about 40 J/cm² at the exposed surface $ES_k$ of the exposed layer $L_k$; the peak intensity 42 of the intensity profile 40 is from about 5 kW/cm² to about 20 kW/cm² at the exposed surface $ES_k$ of the exposed layer $L_k$; and the consolidating transformation includes: neck-to-neck sintering of at least 50 percent of particles in the build material 16 of the exposed layer $L_k$; and fusion between the exposed layer $L_k$ and the layer $L_{k-1}$ having the sequence position k−1 one less than the sequence position k of the exposed layer $L_k$.

In still another one of these examples, the build material 16 is a build material powder having an average particle size of about 40 μm; and the fluence is a product of 17 J/cm² and the ratio of the respective thickness $d_k$ of the layer $L_k$ to the average particle size D of the build material powder.

In one specific example, the build material 16 is an AlSi10Mg powder and the thickness $d_k$ of each layer $L_k$ is from about 40 micrometers (μm) to about 100 μm; the peak intensity 42 of each intensity profile 40 in the series E of energy functions is from about 5 kW/cm² to about 20 kW/cm² at the exposed surface $ES_k$ of the respective layer $L_k$; when the sequence position k of the exposed layer $L_1$ is 1: the exposed layer $L_1$ is spread directly on a thermally insulating substrate; the fluence in the respective energy function is from about 17 J/cm² to about 40 J/cm² at the exposed surface $ES_1$ of the exposed layer $L_1$; and the consolidating transformation is a melting of at least 70 percent of particles in the build material 16 of the exposed layer $L_1$; and when the sequence position k of the exposed layer is greater than 1: the fluence in the respective energy function is from about 10 J/cm² to about 40 J/cm² at the exposed surface $ES_k$ of the exposed layer $L_k$; and the consolidating transformation includes: neck-to-neck sintering of at least 50 percent of the particles in the build material 16 of the exposed layer $L_k$; and fusion between the exposed layer $L_k$ and the layer $L_{k-1}$ having a sequence position k−1 one less than the sequence position k of the exposed layer $L_k$.

An enlarged (as compared to FIG. 3A), schematic, and partially cross-sectional cutaway view of the exposed surface $ES_k$ of an exposed/respective layer $L_k$ being exposed to the radiated energy 32 from the flood energy source 34 is shown in FIG. 3C. In the example shown in FIG. 3C, the build material 16 in the layer $L_1$ having a sequence position of 1 has previously undergone (before layer 26 was spread over layer 24) a consolidating transformation to form layer 24. FIG. 3C depicts layer 24 as a solid layer, indicating 100% of the particles of the build material 16 in layer 24 have melted to form a solid layer 24. In some examples, complete melting of the first layer $L_1$ (the layer having a sequence position of 1) may be desirable. In other examples, less than complete melting of the first layer $L_1$ may be sufficient to achieve the desired intermediate part 36. In an example of the present disclosure, at least 70 percent of the particles of the build material 16 in the layer $L_1$ having a sequence position of 1 melt to form layer 24.

As also depicted in FIG. 3C, the build material 16 in the layer $L_2$ having a sequence position of 2 undergoes a consolidating transformation to form layer 26. In FIG. 3C, the consolidating transformation of the build material 16 in the layer $L_2$ having a sequence position of 2 is depicted as neck-to-neck sintering. As used herein, a percentage of neck-to-neck sintering is based on a percentage of contacts between particles that are sintered. For example, if 1 spherical particle is contacted by 6 adjacent particles, but has neck-to-neck sintering with 3 of the contacting particles, then the percentage of neck-to-neck sintering is 50 percent. In the example of the present disclosure depicted in FIG. 3C, 100 percent of the particles of the build material 16 in the layer $L_2$ having a sequence position of 2 are sintered neck-to-neck to form layer 26. Therefore, at least 50 percent of particles of the build material 16 in the layer $L_2$ having a sequence position of 2 are sintered neck-to-neck to form layer 26.

As also shown in FIG. 3C, layer 26 is fused to layer 24. As used herein, fusion between layers means at least 50 percent of the particles in a sintered layer are attached to an adjacent layer to form a solid piece. In examples, the fusion may occur by sintering at a temperature below the melting point of the build material 16. In other examples, the fusion between layers may include melting of a portion of either adjacent layer. For example, a portion of the particles in layer 26 may melt and solidify with layer 24, and a portion of solidified layer 24 may melt and solidify with the particles in layer 26. The fusion between layers may be similar to neck-to-neck sintering, except one layer may not have separately discernable particles.

In some examples, the exposing of the exposed surface $ES_1$ of the layer $L_1$ having a sequence position of 1 to the radiated energy 32 from the flood energy source 34 attaches the layer 24 formed therefrom to the build area platform 12. In these examples, the first layer 24 is fused to the build area platform 12. In some other examples, the first layer 24 may attached to the build area platform 12 with chemical adhesives. The chemical adhesives may be thermally activated. In still other examples, the first layer 24 may be attached to the build area platform 12 in any suitable manner. It may be desirable to attach the first layer 24 to the build area platform 12 to prevent cracks from forming in the layer 24. The build area platform 12 may include a replaceable portion, such as a platen or glass plate. In examples where the first layer 24 is attached to the build area platform 12, the portion of the build area platform 12 that is attached to the intermediate part 36 may be removed by mechanical machining, polishing, etching, dissolving, melting, ablation or any suitable technique. In an example, a frangible layer may be included between the intermediate part 36 and the portion of the build area platform 12 that is to be detached from the intermediate part 36.

In some examples of the methods 100, 200, the flood energy source 34 is a Xenon flash lamp and the intensity profile 40 has a duration ranging from about 100 microseconds (μsec) to about 30 milliseconds (msec). In one of these examples, the flood energy source 34 repeatedly emits the radiated energy 32 defined by the intensity profile 40 in a predetermined number of stages at a repetition rate. In an example, the predetermined number of stages is from 1 to 100 and the repetition rate having a period of about 0.1 second to about 10 seconds.

In others examples of the methods 100, 200, the flood energy source 34 is a semiconductor laser, a gas laser, an array of the semiconductor lasers or an array of the gas lasers. In an example, the gas laser is a high-power $CO_2$ (carbon dioxide) laser or Ar (argon) laser. It is to be understood that the flood energy source 34, no matter what principle of operation the flood energy source 34 uses, is capable of exposing an entire layer of build material 16 to the radiated energy 32 without scanning during the exposing.

In some examples, the amount of energy used to cause the consolidating transformation of the sequence 50 of layers may be less than an amount of energy sufficient to cause the same consolidating transformation of the sequence 50 of layers using selective laser sintering (SLS). In one of these examples, the amount of energy used to cause the consolidating transformation of the sequence 50 of layers may be about 10× (i.e., 10 times) less than an amount of energy sufficient to cause the same consolidating transformation of the sequence 50 of layers using selective laser sintering. As such, examples of the methods 100, 200 for additive manufacturing of metals may be more energy efficient than selective laser sintering.

Figure 4:
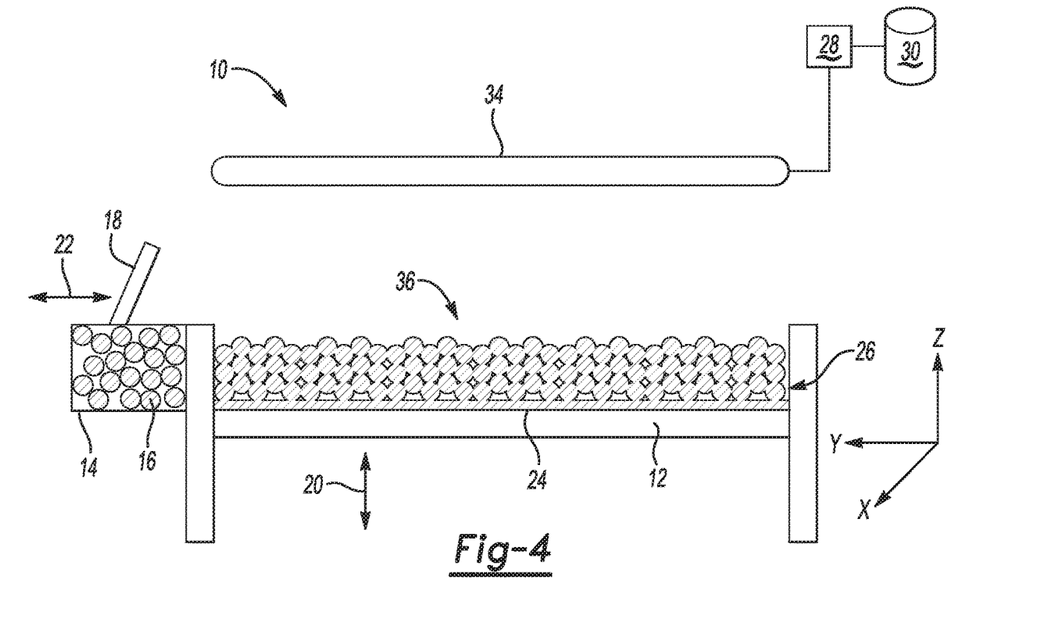
FIG. 4 is a schematic and partially cross-sectional view of an example of a three dimensional (3D) printer disclosed herein.

The consolidating transformation of the sequence 50 of layers may form intermediate part layers (e.g., layer 24 and layer 26), and ultimately an intermediate part 36 (see FIG. 4). The intermediate part 36, shown in FIG. 4, includes the layer 24, the layer 26, and additional layers established thereon.

As used herein, the term "intermediate part" refers to a part precursor that has a shape representative of the final 3D part, and that includes build material 16 that has undergone consolidating transformation. In the intermediate part 36, the build material 16 is bound due to its at least partial melting or sintering. The at least partial melting or sintering may be neck-to-neck melting or neck-to-neck sintering. It is to be understood that any build material 16 that has not undergone consolidating transformation is not considered to be part of the intermediate part 36, even if it is adjacent to or surrounds the intermediate part 36. In these examples, the consolidating transformation of the build material 16 provides the intermediate part 36 with enough mechanical strength that it is able to be handled or to withstand extraction from the build area platform 12 without being deleteriously affected (e.g., the shape is not lost, damaged, etc.).

The intermediate part 36 may also be referred to as a "green" part, but it is to be understood that the term "green" when referring to the intermediate/green part or does not connote color, but rather indicates that the part is not yet fully processed.

While not shown in the Figures, examples of the methods 100, 200 may further include heating the intermediate part 36 to form a final part. As used herein the term "final part" refers to a part that is able to be used for its desired or intended purpose. Examples of the final part may include melted and/or sintered build material 16 particles that have merged together to form a continuous body. By "continuous body," it is meant that the build material 16 particles are merged together to form a single part with sufficient mechanical strength to be used for the desired or intended purpose of the final part.

In some examples, the intermediate part 36 may be extracted from the build area platform 12 and placed in a heating mechanism (e.g., an oven). The heating mechanism may be used to heat the intermediate part 36 to form the final part.

The final part may be formed by applying heat to sinter the metal in the intermediate part 36. Sintering may be performed in stages, where initial, lower sintering temperatures can result in the formation of weak bonds that are strengthened during final sintering. The initial sintering temperature may be selected to densify the intermediate part 36 and to decrease or eliminate any porosity throughout the intermediate part 36. The initial sintering temperature may be capable of softening the metal. The initial sintering temperature may thus be dependent upon the metal used in the build material 16. Moreover, the initial sintering temperature may also be dependent on the sintering rate of the metal. For example, metal powders with a smaller particle size can be sintered at a higher rate at lower temperatures than powders of the same metal with a larger particle size.

During final sintering, the metal particles continue to coalesce to form the final part having a desired density. The final sintering temperature is a temperature that is sufficient to sinter the remaining metal particles.

The sintering temperature may depend upon the composition of the metal particles. During final sintering, the intermediate part 36 may be heated to a temperature ranging from about 80% to about 99.9% of the melting point(s) of the metal. In another example, the intermediate part 36 may be heated to a temperature ranging from about 90% to about 95% of the melting point(s) of the metal. In still another example, the intermediate part 36 may be heated to a temperature ranging from about 60% to about 90% of the melting point(s) of the metal. In yet another example, the final sintering temperature may range from about 10° C. below the melting temperature of the metal to about 50° C. below the melting temperature of the metal. In still another example, the final sintering temperature may range from about 100° C. below the melting temperature of the metal to about 200° C. below the melting temperature of the metal. The final sintering temperature may also depend upon the particle size and time for sintering (i.e., high temperature exposure time).

In an example, a final sintering temperature for aluminum or aluminum alloys may range from about 550° C. to about 670° C. While these temperatures are provided as final sintering temperature examples, it is to be understood that the final sintering temperature depends upon the metal that is utilized, and may be higher or lower than the provided examples.

Heating at a suitable final sintering temperature sinters and fuses the metal to form the final part, which may be densified relative to the intermediate part 36. For example, as a result of final sintering, the density may go from 50% density to over 90%, and in some cases very close to 100% of the theoretical density.

The length of time for which the heat (for sintering) is applied and the rate at which the intermediate part 36 is heated may be dependent, for example, on one or more of: characteristics of the heating mechanism, characteristics of the metal particles (e.g., metal type, particle size, etc.), and/or the characteristics of the intermediate part 36 (e.g., wall thickness). The intermediate part 36 may be heated at the sintering temperature(s) for respective time periods ranging from about 20 minutes to about 15 hours. In an example, each time period is 60 minutes. In another example, each time period is 90 minutes. The intermediate part 36 may be heated to each of the initial sintering temperature and the final sintering temperature at a rate ranging from about 1° C./minute to about 20° C./minute.

In some examples, the heating of the intermediate part 36 to form the final part is accomplished in an environment containing an inert gas, a low reactivity gas, a reducing gas, or a combination thereof. Sintering may be accomplished in such an environment so that the metal will sinter rather than undergoing an alternate reaction (e.g., an oxidation reaction) which would fail to produce the final part.

Three Dimensional (3D) Printers

Referring now to FIG. 4, an example of a 3D printer 10 is schematically depicted. It is to be understood that the 3D printer 10 may include additional components (some of which are described herein) and that some of the components described herein may be removed and/or modified. Furthermore, components of the 3D printer 10 depicted in FIG. 4 is schematic, and may not be drawn to scale. Thus, the 3D printer 10 may have a different size and/or configuration other than as shown therein.

In an example, the three dimensional (3D) printer 10, comprises: a build material distributor 18 to spread a build material 16 including a metal in a sequence 50 of layers, each layer $L_k$ having a respective thickness $d_k$, a respective sequence position K, and a respective exposed surface $ES_k$, wherein each respective exposed surface $ES_k$ has a surface area of at least 5 square centimeters ($cm^2$); and a flood energy source 34 to radiate energy 32 (see FIG. 3C) to be received at the respective exposed surface $ES_k$ of each layer $L_k$ prior to a spreading of a subsequent layer $L_{k+1}$ by the build material distributor 18, wherein the energy 32 radiated by the flood energy source 34 has an intensity profile and a fluence sufficient to cause a consolidating transformation of the build material 16 in the respective exposed layer $L_k$.

In some examples, the 3D printer may further include a supply 14 of a build material 16; and a non-transitory computer readable medium having stored thereon computer executable instructions to cause the controller 28 to: utilize the build material distributor 18 to spread the build material 16 in a sequence 50 of layers, each layer $L_k$ having a respective thickness $d_k$, a respective sequence position k, and a respective exposed surface $ES_k$; and utilize the flood energy source 34 to expose each layer $L_k$ to the radiated energy 32 to cause the consolidating transformation of the build material 16 in each layer $L_k$ prior to the spreading of the subsequent layer $L_{k+1}$.

As shown in FIG. 4, the 3D printer 10 may include the build area platform 12, the build material supply 14 containing the build material 16, and the build material distributor 18.

As mentioned above, the build area platform 12 receives the build material 16 from the build material supply 14. The build area platform 12 may be integrated with the 3D printer 10 or may be a component that is separately insertable into the 3D printer 10. For example, the build area platform 12 may be a module that is available separately from the 3D printer 10. The build area platform 12 that is shown is one example, and could be replaced with another support member, such as a platen, a fabrication/print bed, a glass plate, or another build surface.

As also mentioned above, the build material supply 14 may be a container, bed, or other surface that is to position the build material 16 between the build material distributor 18 and the build area platform 12. In some examples, the build material supply 14 may include a surface upon which the build material 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material 16 from a storage location to a position to be spread onto the build area platform 12 or onto a previously formed layer of the intermediate part 36.

As also mentioned above, the build material distributor 18 may be a blade (e.g., a doctor blade), a roller, a combination of a roller and a blade, and/or any other device capable of spreading the build material 16 over the build area platform 12 (e.g., a counter-rotating roller).

In some examples, the build material supply 14 or a portion of the build material supply 14 may translate along with the build material distributor 18 such that build material 16 is delivered continuously to the build material distributor 18 rather than being supplied from a single location at the side of the 3D printer 10 as depicted in FIG. 4.

As shown in FIG. 4, the 3D printer 10 also includes a flood energy source 34. In some examples, the flood energy source 34 may be in a fixed position with respect to the build area platform 12. In these examples, the flood energy source 34 is capable of exposing an entire layer of build material 16 to the radiated energy 32 from its fixed position. As examples, the flood energy source 34 may be positioned from 5 mm to 150 mm, 25 mm to 125 mm, 75 mm to 150 mm, 30 mm to 70 mm, or 10 mm to 20 mm away from the exposed layer during operation.

The flood energy source 34 is capable of generating radiated energy 32 at an intensity profile and fluence sufficient to cause the consolidating transformation of the build material 16. In an example, the flood energy source 34 is capable of emitting energy 32 with an intensity ranging from greater than 0 $kW/cm^2$ to about 50 $kW/cm^2$. In another example, the flood energy source 34 is capable of emitting energy 32 with a fluence ranging from greater than 0 $J/cm^2$ to about 100 $J/cm^2$.

In an example, the flood energy source 34 is a pulse gas discharge lamp, such as a xenon flashtube, a krypton flash tube, an argon flashtube, a neon flashtube, or a flashtube including a combination of xenon, krypton, argon, and neon. In another example, the flood energy source 34 is a xenon pulse lamp. In yet another example, the flood energy source 34 is an array of fiber lasers, such as a laser including an optical fiber doped with erbium, ytterbium, neodymium, dysprosium, praseodymium, thulium, or holmium. In yet another example, the flood energy source 34 is a semiconductor laser, a gas laser, an array of the semiconductor lasers or an array of the gas lasers. In an example, the gas laser is a high-power $CO_2$ laser or Ar laser.

Each of the previously described physical elements may be operatively connected to a controller 28 of the 3D printer 10. The controller 28 may process manufacturing data that is based on a 3D object model of the 3D object/part to be generated. In response to data processing, the controller 28 may control the operations of the build area platform 12, the build material supply 14, the build material distributor 18, and the flood energy source 34. As an example, the controller 28 may control actuators (not shown) to control various operations of the 3D printer 10 components. The controller 28 may be a computing device, a semiconductor-based microprocessor, a central processing unit (CPU), an application specific integrated circuit (ASIC), and/or another hardware device. The controller 28 may be connected to the 3D printer components via hardware communication lines, or wirelessly via radio or photonic communication.

The controller 28 manipulates and transforms data, which may be represented as physical (electronic) quantities within the printer's registers and memories, in order to control the physical elements to create the 3D part. As such, the controller 28 is depicted as being in communication with a data store 30. The data store may also be referred to as a computer memory. The data store 30 may include data pertaining to a 3D part to be manufactured by the 3D printer 10. The data for the selective delivery of the build material 16, etc. may be derived from a model of the 3D part to be formed. The data store 30 may also include machine readable instructions (stored on a non-transitory computer readable medium) that are to cause the controller 28 to control the amount of build material 16 that is supplied by the build material supply 14, the movement of the build area platform 12, the movement of the build material distributor 18, etc.

While one controller 28 is shown in FIG. 4, it is to be understood that multiple controllers may be used. For example, one controller may control the build area platform 12, the build material supply 14, and the build material distributor 18, and another controller (e.g., controller 28) may control the flood energy source 34.

To further illustrate the present disclosure, an example is given herein. It is to be understood that this example is provided for illustrative purposes and is not to be construed as limiting the scope of the present disclosure.

Example

An example of the intermediate part disclosed herein was manufactured. An AlSi10Mg powder (from LPW, LPW-AlSi10MG-AABJ) with a particle size of 20 μm to 63 μm was used as the build material. AlSi10Mg has: a heat of fusion ($H_f$) of 321 J/g; a specific heat (c) of 0.897 J/g/K; a melting point ($T_m$) of 660° C.; a density (p) of 2.68 g/cm³; and absorptivity (A) of about 0.3.

The AlSi10Mg powder was spread on a glass substrate in a sequence of 6 layers, each layer having the respective thickness shown in Table 1. The sequence position of each layer is shown in Table 1 with the corresponding thickness. The layer at sequence position 1 was spread directly onto the glass substrate.

TABLE 1

| Layer sequence position | Micrometer setting | Layer thickness |
|---|---|---|
| 6 | 5800 μm | 100 μm |
| 5 | 5700 μm | 70 μm |
| 4 | 5630 μm | 70 μm |
| 3 | 5560 μm | 70 μm |
| 2 | 5490 μm | 70 μm |
| 1 | 5420 μm | 70 μm |

Each layer was exposed to radiated energy using a PulseForge® 1300 as the flood energy source. The minimum fluence expected to melt a 70 μm thick layer of AlSi10Mg powder was 29.1 J/cm² (calculated by applying the heat of fusion ($H_f$), specific heat (c), melting point ($T_m$), density (p), and absorptivity (A) of AlSi10Mg, assuming D=40 μm, unit area=1 cm², and η=0.5236 into Eq. 8, Eq. 4, Eq. 3, and Eq. 10).

In experiments with AlSi10Mg powder, the inventors found that the threshold of sintering was about the same as the theoretical minimum fluence expected to melt (about 30 J/cm²) when the thickness (and therefore the mass) was accounted for. Thus, the theoretical minimum fluence, based on Eq. 8, Eq. 4, Eq. 3 and Eq. 10, was not enough to completely melt the AlSi10Mg powder.

Further, it was found, in experiments on stainless steel powders by the inventors, that cracks may be avoided by 1) firmly attaching the first layer to the glass substrate, and 2) avoiding Marangoni effect by preventing the surface temperature from getting too high by keeping the intensity low relative to the absorptivity during the application of the radiated energy. Firm attachment to the first layer may be accomplished in any suitable manner, including, for example, by chemical adhesives or fusion of the powder in contact with the substrate.

Experiments by the inventors have shown that fusion of the first layer of AlSi10Mg to the glass substrate, which results in a mirror like appearance when viewed through the glass substrate, was achievable using the PulseForge® 1300 when the fluence was at least 40 J/cm² when the thickness was about 80 μm. Higher fluence tended to increase the fusion. Therefore, the fluence that was sufficient to melt the first layer was higher than predicted by the theoretical calculations using Eq. 8, Eq. 4, Eq. 3, and Eq. 10.

The intensity profile to deliver the fluence for each of the 6 layers of the Example was determined based on the operating characteristics of the flood energy source (PulseForge® 1300). The intensity profile was, in part, determined by the Xenon lamp cooling capability in the PulseForge® 1300. Prior experiments performed by the inventors have shown that PulseForge® 1300 at 700 Volts creates an exponentially decaying intensity profile, with an initial (peak) intensity of 13 kW/cm². A fluence of 50 J/cm² resulted from an 18 msec intensity profile duration where the radiated energy was divided into 20 slices at a 91% duty cycle as depicted in FIG. 5.

In the Example, the first layer was spread and exposed to the radiated energy having the intensity profile depicted in FIG. 5. The second layer was also exposed to a fluence of 30 J/cm², however, the intensity profile had a peak intensity of 30 kW/cm², a duration of 10 msec, and was divided into 10 slices. Each layer was examined after the exposure to the radiated energy. The first layer was well attached to the glass substrate, and layers 2-6 each had good fusion. Starting at the fourth layer, some of the edges were weak where the edge of the subsequent layer extended beyond the edge of the layers below. This resulted in the overhanging edges of the subsequent layers being about 280 µm thick, which may have been too thick for good fusion. On the fourth layer (but on no other layer), a second stage of the intensity profile was applied, but there was almost no change in the fusion of the fourth layer.

Figure 6:
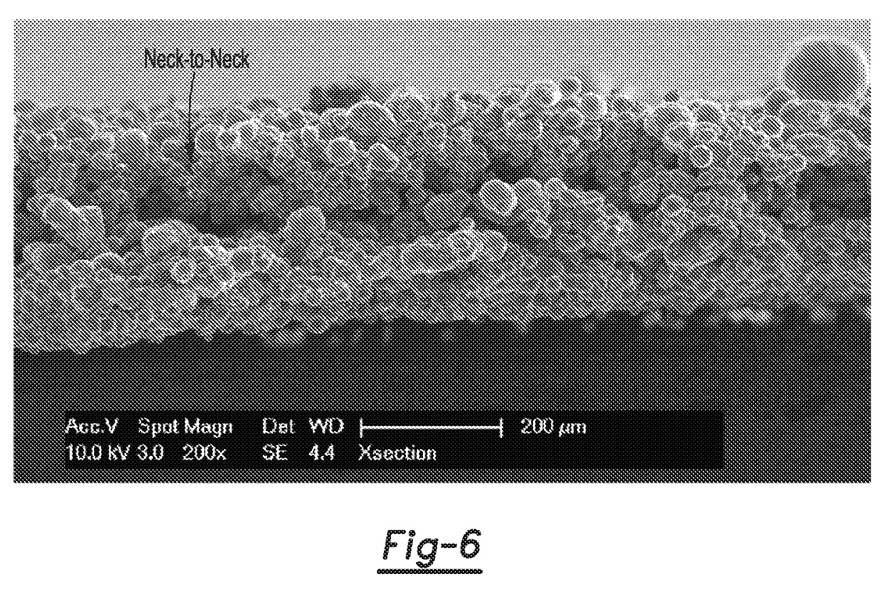
FIG. 6 is a scanning electron microscope (SEM) image, at 200 times magnification, of a cross-section of an example intermediate part disclosed herein.

FIG. 6 shows a SEM image, at 200 times magnification, of a cross-section of an example intermediate part similar to the example part described above in the Example. The example intermediate part shown in FIG. 6 was produced by spreading AlSi10Mg powder on a glass substrate in a sequence of 5 layers and exposing each layer to radiated energy from the PulseForge® 1300. As shown in FIG. 6, the upper layers (i.e., the layers in sequence positions 2-5) have been neck-to-neck sintered. As also shown in FIG. 6, the first layer (i.e., the layer in sequence position 1) has been melted.

It is to be understood that the ranges provided herein include the stated range and any value or sub-range within the stated range, as if the value(s) or sub-range(s) within the stated range were explicitly recited. For example, a range greater than 0 kW/cm$^2$ to about 50 kW/cm$^2$ should be interpreted to include the explicitly recited limits of greater than 0 kW/cm$^2$ to about 50 kW/cm$^2$, as well as individual values, such as 5.73 kW/cm$^2$, 26 kW/cm$^2$, 47.2 kW/cm$^2$, etc., and sub-ranges, such as from about 5.25 kW/cm$^2$ to about 44.25 kW/cm$^2$, from about 16 kW/cm$^2$ to about 48.75 kW/cm$^2$, from about 3.5 kW/cm$^2$ to about 40 kW/cm$^2$, etc. Furthermore, when "about" is utilized to describe a value, this is meant to encompass minor variations (up to +/−10%) from the stated value. As used herein, the term "few" means about three.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for additive manufacturing of metals, comprising:
   spreading a build material including a metal in a sequence of layers, each layer having a respective thickness of from about 40 micrometers (µm) to about 100 micrometers (µm), a respective sequence position, and a respective exposed surface to receive radiated energy from a flood energy source prior to spreading of a subsequent layer, wherein each respective exposed surface has a surface area of at least 5 square centimeters (cm$^2$);
   exposing, layer-by-layer, the exposed surface of each layer to the radiated energy from the flood energy source, the energy radiated at an intensity profile and a fluence sufficient to cause a consolidating transformation of the build material in the exposed layer, wherein the flood energy source is a Xenon flash lamp and the intensity profile has a duration ranging from about 100 microseconds (µsec) to about 30 milliseconds (msec), and wherein the consolidating transformation of the build material in the exposed layer forms an intermediate part; and
   sintering the intermediate part to form a final part.

2. The method as defined in claim 1 wherein:
   the build material has a thermal conductivity greater than or equal to 150 Watts per meter per Kelvin (W/m/K); and
   the fluence of the radiated energy from the flood energy source is from about 10 Joules per square centimeter (J/cm$^2$) to about 70 J/cm$^2$ at the exposed surface of each layer and a peak intensity of the intensity profile is from about 5 kilowatts per square centimeter (kW/cm$^2$) to about 40 kW/cm$^2$ at the exposed surface of each layer.

3. The method as defined in claim 1 wherein the flood energy source repeatedly emits the radiated energy defined by the intensity profile in a predetermined number of stages at a repetition rate.

4. The method as defined in claim 1 wherein a peak intensity of the intensity profile is less than a predetermined maximum peak intensity to limit Marangoni effect cracks in the exposed layer.

5. The method as defined in claim 2 wherein the build material is an AlSi10Mg powder.

6. The method as defined in claim 5 wherein, when the exposed layer is a first layer spread directly on a thermally insulating substrate:
   the fluence is from about 17 J/cm$^2$ to about 40 J/cm$^2$ at the exposed surface of the first layer;
   the peak intensity of the intensity profile is from about 5 kW/cm$^2$ to about 20 kW/cm$^2$ at the exposed surface of the first layer; and
   the consolidating transformation is a melting of at least 70 percent of particles in the build material of the first layer.

7. The method as defined in claim 5 wherein, when the exposed layer has a sequence position greater than 1:
   the fluence is from about 10 J/cm$^2$ to about 40 J/cm$^2$ at the exposed surface of the exposed layer;
   the peak intensity of the intensity profile is from about 5 kW/cm$^2$ to about 20 kW/cm$^2$ at the exposed surface of the exposed layer; and
   the consolidating transformation includes:
      neck-to-neck sintering of at least 50 percent of particles in the build material of the exposed layer; and
      fusion between the exposed layer and the layer having the sequence position one less than the sequence position of the exposed layer.

8. The method as defined in claim 5 wherein:
   the build material is a build material powder having an average particle size of about 40 µm; and
   the fluence is a product of 17 J/cm$^2$ and a ratio of the respective thickness of the layer to the average particle size of the build material powder.

9. The method as defined in claim 3 wherein the predetermined number of stages is from 1 to 100 and the repetition rate has a period of about 0.1 second to about 10 seconds.

10. A method for additive manufacturing of metals, comprising:
   spreading a build material including a metal in a sequence of layers, each layer having a respective thickness of from about 40 micrometers (µm) to about 100 micrometers (µm), a respective sequence position, and a respective exposed surface to receive radiated energy from a flood energy source prior to spreading of a subsequent layer, wherein each respective exposed surface has a surface area of at least 5 square centimeters (cm$^2$);

sequentially exposing, layer-by-layer, the exposed surface of each respective layer to the radiated energy from the flood energy source, the radiated energy emitted by the flood energy source in a series of energy functions, each energy function in the series of energy functions including an intensity profile, and a fluence corresponding to the sequence position of each respective layer thereby causing a consolidating transformation of the build material in the respective layers, wherein the flood energy source is a Xenon flash lamp and the intensity profile has a duration ranging from about 100 microseconds (μsec) to about 30 milliseconds (msec), and wherein the consolidating transformation of the build material in the respective layers forms an intermediate part; and sintering the intermediate part to form a final part.

11. The method as defined in claim 10 wherein:

the build material has a thermal conductivity greater than or equal to 150 Watts per meter per Kelvin (W/m/K); and the fluence corresponding to the sequence position of each respective layer is from about 10 Joules per square centimeter (J/cm$^2$) to about 100 J/cm$^2$ at the exposed surface of the respective layer; and a peak intensity of the intensity profile corresponding to the sequence position of each respective layer is from about 5 kilowatts per square centimeter (kW/cm$^2$) to about 100 kW/cm$^2$ at the exposed surface of the respective layer.

12. The method as defined in claim 11 wherein:

the build material is an AlSi10Mg powder;

the peak intensity of each intensity profile in the series of energy functions is from about 5 kW/cm$^2$ to about 20 kW/cm$^2$ at the exposed surface of the respective layer;

when the sequence position of the exposed layer is 1:
the exposed layer is spread directly on a thermally insulating substrate;
the fluence in the respective energy function is from about 17 J/cm$^2$ to about 40 J/cm$^2$ at the exposed surface of the exposed layer; and
the consolidating transformation is a melting of at least 70 percent of particles in the build material of the exposed layer; and when the sequence position of the exposed layer is greater than 1:
the fluence in the respective energy function is from about 10 J/cm$^2$ to about 40 J/cm$^2$ at the exposed surface of the exposed layer; and
the consolidating transformation includes:
neck-to-neck sintering of at least 50 percent of the particles in the build material of the exposed layer; and
fusion between the exposed layer and the layer having a sequence position one less than the sequence position of the exposed layer.

* * * * *